(12) United States Patent
Facchi

(10) Patent No.: US 7,887,961 B2
(45) Date of Patent: Feb. 15, 2011

(54) FUEL CELL WITH HYDROGEN INTERNAL RECIRCULATION

(75) Inventor: Daniele Facchi, Rovato (IT)

(73) Assignee: Nuvera Fuel Cells Europe S.R.L., S. Donato Milanese (IT)

( * ) Notice: Subject to any disclaimer, the term of this patent is extended or adjusted under 35 U.S.C. 154(b) by 823 days.

(21) Appl. No.: 11/667,157

(22) PCT Filed: Dec. 9, 2005

(86) PCT No.: PCT/EP2005/013235

§ 371 (c)(1),
(2), (4) Date: May 2, 2007

(87) PCT Pub. No.: WO2006/061239

PCT Pub. Date: Jun. 15, 2006

(65) Prior Publication Data

US 2008/0124589 A1    May 29, 2008

(30) Foreign Application Priority Data

Dec. 10, 2004    (IT)    .................... MI2004A2351

(51) Int. Cl.
*H01M 8/06*    (2006.01)
*H01M 8/18*    (2006.01)

(52) U.S. Cl. ................ 429/415; 429/416; 429/417; 429/418; 204/DIG. 4

(58) Field of Classification Search .............. 429/17, 429/34, 415, 416, 417, 418; 204/DIG. 4
See application file for complete search history.

(56) References Cited

U.S. PATENT DOCUMENTS

2002/0172844 A1*    11/2002   Ito et al.   ................... 429/17

OTHER PUBLICATIONS

Electrochemical Hydrogen Compressor B. Röhland Feb. 6, 1998 pp. 3841-3846.

* cited by examiner

*Primary Examiner*—Patrick Ryan
*Assistant Examiner*—Julian Mercado
(74) *Attorney, Agent, or Firm*—Finnegan, Henderson, Farabow, Garrett & Dunner, LLP

(57) ABSTRACT

A unit consisting of a fuel cell, provided with a first ion-exchange membrane, and an electrolysis cell, equipped with a second ion-exchange membrane, capable of operating as an electrochemical hydrogen pump in which the electrolysis cell sucks in the discharge gas of the fuel cell anodic compartment which contains hydrogen as the main component, ionizes the hydrogen on a suitable anodic catalyst, sends the so formed protons across the second ion-exchange membrane to a suitable cathodic catalyst where the protons are reconverted to hydrogen which is mixed to the fuel cell hydrogen feed.

14 Claims, 7 Drawing Sheets

FUEL CELL WITH HYDROGEN INTERNAL RECIRCULATION

This application is a 371 of PCT/EP2005/013235 filed Dec. 9, 2005.

BACKGROUND OF THE INVENTION

Fuel cells are devices characterised by the possibility of converting the chemical energy of combination of a fuel and an oxidant directly into electrical energy. For this reason, fuel cells are not subject to the known limitation of Carnot's cycle, based on an intermediate thermal stage, and are therefore characterised by a high energy efficiency.

Among the several types under development at present, ion-exchange membrane fuel cells are considered of peculiar interest for automotive and for medium-small size residential generation applications, due to the compactness, the relative operating simplicity and the absence of important decay phenomena in the construction materials.

The oxidant normally employed in ion-exchange membrane fuel cells is air, at near-atmospheric pressure or under a pressure not exceeding 3-4 bar. The fuel, fed at about the same pressure as air, may consist of a gas containing hydrogen together with other components such as carbon dioxide and nitrogen, usually obtained by conversion of hydrocarbons or alcohols in reactors known as modifiers, among which steam reformers and autothermal reformers are the most common. Such type of gas is affected by two important drawbacks, namely the presence of residual traces of carbon monoxide, which is in fact an unavoidable intermediate compound in the conversion of hydrocarbons or alcohols into hydrogen, and the need of purging remarkable quantities of gas from the fuel cell to prevent an intolerable build-up of carbon monoxide and nitrogen in its interior. Carbon monoxide is capable, even as traces, to block the conventional platinum catalysts used in fuel cell electrodes forcing the use of special alloys, which are more expensive and whose reliability is still to be proved. Considerable purge flow-rates pose the problem of the utilisation of the hydrogen contained therein, for instance as fuel of the steam reforming reactor in automotive applications or as fuel for the generation of thermal energy in residential-type applications, in both cases with sensible complications of the overall system.

As an alternative, fuel cells may be fed with pure hydrogen, obtainable in particular cases by electrolysis or more generally from the same gas mixtures produced in steam reforming or autothermal reforming reactors through a passage across suitable separation units, based for instance on metal or polymer selective membranes or on absorbing materials such as certain types of molecular sieves. The fuel cell feed on pure hydrogen allows using the conventional platinum catalysts whose working reliability over an extended period of time is widely demonstrated and in principle to operate with unit stoichiometry flow-rates, in other words with flow-rates exactly corresponding to the amount of hydrogen consumed by the output current. Nevertheless this operating mode, known to those skilled in the art as "dead-end mode", introduces at least two kinds of problems. The former problem is associated to the capacity of the nitrogen contained in the air on the fuel cell cathode compartment to diffuse across the ion-exchange membrane, progressively building up in the stagnant hydrogen present on the anode side, particularly near the bottom: the consequent hydrogen dilution determines a preferential distribution of the output current in those zones with a less relevant presence of nitrogen, with a consequent performance decay and a possible lifetime decrease. The latter problem is caused by the presence of liquid water formed by condensation of the water vapour transported by diffusion from the cathode compartment, similarly to what occurs with nitrogen. The progressive liquid water build-up leads to flooding phenomena of the porous anode catalyst structure, with an additional performance decay which sums up to the one induced by the accumulation of nitrogen. In order to obviate to this inconvenience, it was proposed to carry out periodical purges, allowing to extract nitrogen and water accumulated during the operating time: by appropriately regulating the purge frequency, it is possible to prevent this performance decay. This method, however, is effective with fuel cells operating under pressure, since only in this situation the decompression caused by the purging permits a deep renewal of the anodic gas: the decompression taking place in this way nevertheless determines an abnormal mechanical solicitation of the delicate ion-exchange membrane whose lifetime may thus be shortened.

As an alternative, it is possible to operate the fuel cell with an above-stoichiometric hydrogen flow-rate: the discharge of excess hydrogen allows to continuously withdraw nitrogen and water diffusing across the ion-exchange membrane before build-ups hampering the performances occur. The excess of hydrogen must however be exploited, with the consequent complications of the overall system, as already mentioned for the case of feeding with gas mixtures produced in modifiers.

The best prior art solution to the problems of nitrogen and water build-up perhaps consists of the external recycle of exhaust hydrogen through a mechanical pump: by suitably adjusting the recycle flow-rate, it is possible to establish a hydrogen flow in the anode compartment sufficient to keep both the nitrogen concentration and the water accumulation at low levels. A small amount of gas is withdrawn from the circuit to prevent the latter to be excessively enriched in nitrogen and water and to restore the conditions for the performance decay. However, the success of the method is based on the assumption that the overall hydrogen flow-rate consisting of the feed and the recycle be apportioned in a substantially uniform fashion over the multiplicity of fuel cells which must be assembled to obtained the high voltages normally required by the user appliances: since i the passage sections for the feeding of gases to the individual fuel cells have a random distribution around the design value, due to the constructive tolerances and of the inevitable, albeit marginal, imperfections in the assembly of the various components, the hydrogen flow-rate may be lower in some cells with respect to the average value, which makes the extraction of the liquid water from the anode compartment more difficult. The individual fuel cells in which this negative situation takes place are consequently characterised by lower performances, which in extreme cases may even lead the whole stack to be put out of service. This problem, hard to counteract in a system consisting of a multiplicity of components, moreover adds up to the negative aspect of the energy consumption of the recirculation pump.

The latter point was taken into consideration in U.S. 2004/0142215, which represents the closest prior art to our invention. U.S. 2004/0142215 proposes to replace the external recirculation pump with at least one hydrogen-transfer electrochemical cell: this type of cell has a design equivalent to that of the fuel cell, and includes an ion-exchange membrane on whose faces two electrodes, anode and cathode, are applied, both containing a catalyst suitable for hydrogen ionisation to protons and for proton recombination to hydrogen. During operation, the hydrogen-transfer cell anode compartment is fed with the hydrogen exhaust of the fuel cell. The anode provides to the ionisation of hydrogen to protons which migrate across the membrane and are recombined on the opposite side at the cathode, producing pure hydrogen. This product hydrogen is added to the main feed, giving thus rise to the same kind of external recycling which would be obtained by installing a mechanical pump: the ratio between number of hydrogen-transfer cells and number of fuel cells defines the recirculation rate. The hydrogen-transfer cells, installed as a separate module distinct from the fuel cell one or laminated with the fuel cells in a single assembly, may be fed with an external electrical source or otherwise with a portion of the fuel cell electric output. The device of U.S. 2004/0142215 has the merit of eliminating a delicate component such as the recirculation pump with its rotating parts, while retaining the above seen inconveniences of possible malfunctioning of some individual cells presenting reduced passage sections and lower internal hydrogen flow-rates.

THE INVENTION

The present invention has the scope to overcome the inconveniences of the prior art providing a novel unit comprising an ion-exchange membrane fuel cell and a hydrogen-transfer electrochemical cell.

In a first aspect the unit of the invention is comprised of the membrane fuel cell integrated with the hydrogen-transfer cell.

In one preferred embodiment of the invention the unit formed by the membrane fuel cell integrated with the hydrogen-transfer cell is enclosed between two bipolar plates and the internal components of the fuel cell are laminated together with the internal components of the hydrogen-transfer cell.

In a second preferred embodiment of the invention the unit is formed by the membrane fuel cell associated with the hydrogen-transfer cell and is enclosed between two bipolar plates with the internal components of the fuel cell kept separate from the internal components of the hydrogen-transfer cell by means of a third intermediate bipolar plate.

In a further aspect of the invention the fuel cell hydrogen exhaust is introduced into the hydrogen-transfer cell and the hydrogen produced in the hydrogen-transfer cell is internally recycled to the fuel cell anode compartment.

In a further aspect of the invention a lesser quantity of the hydrogen discharged by the membrane fuel cell is vented to the external environment.

In a further aspect of the invention the ratio of the flow-rate of hydrogen fed to the fuel cell to the flow-rate of pure hydrogen generated by the hydrogen-transfer cell is unitary, in other words the fraction of hydrogen feed produced at the transfer cell and recycled to the fuel cell is equal to half of the overall fuel cell anodic hydrogen feed.

In a further aspect of the invention a multiplicity of units, each formed by a membrane fuel cell integrated or mechanically associated with a hydrogen-transfer electrochemical cell, is assembled to make up a stack capable of producing electrical energy at high voltage.

The present invention provides a new internal hydrogen recirculation system in an ion-exchange membrane fuel cell based on a unit formed by common lamination of an ion-exchange membrane fuel cell with an electrochemical ion-exchange membrane hydrogen-transfer cell (hydrogen-transfer cell in the following).

DESCRIPTION OF THE DRAWINGS

The description of the invention will be made making use of the following figures.

DETAILED DESCRIPTION OF THE INVENTION

The unit of the present invention comprises a fuel cell co-laminated and integrated or mechanically associated with a hydrogen-transfer cell giving rise to a novel internal recirculation of hydrogen.

Figure 1:
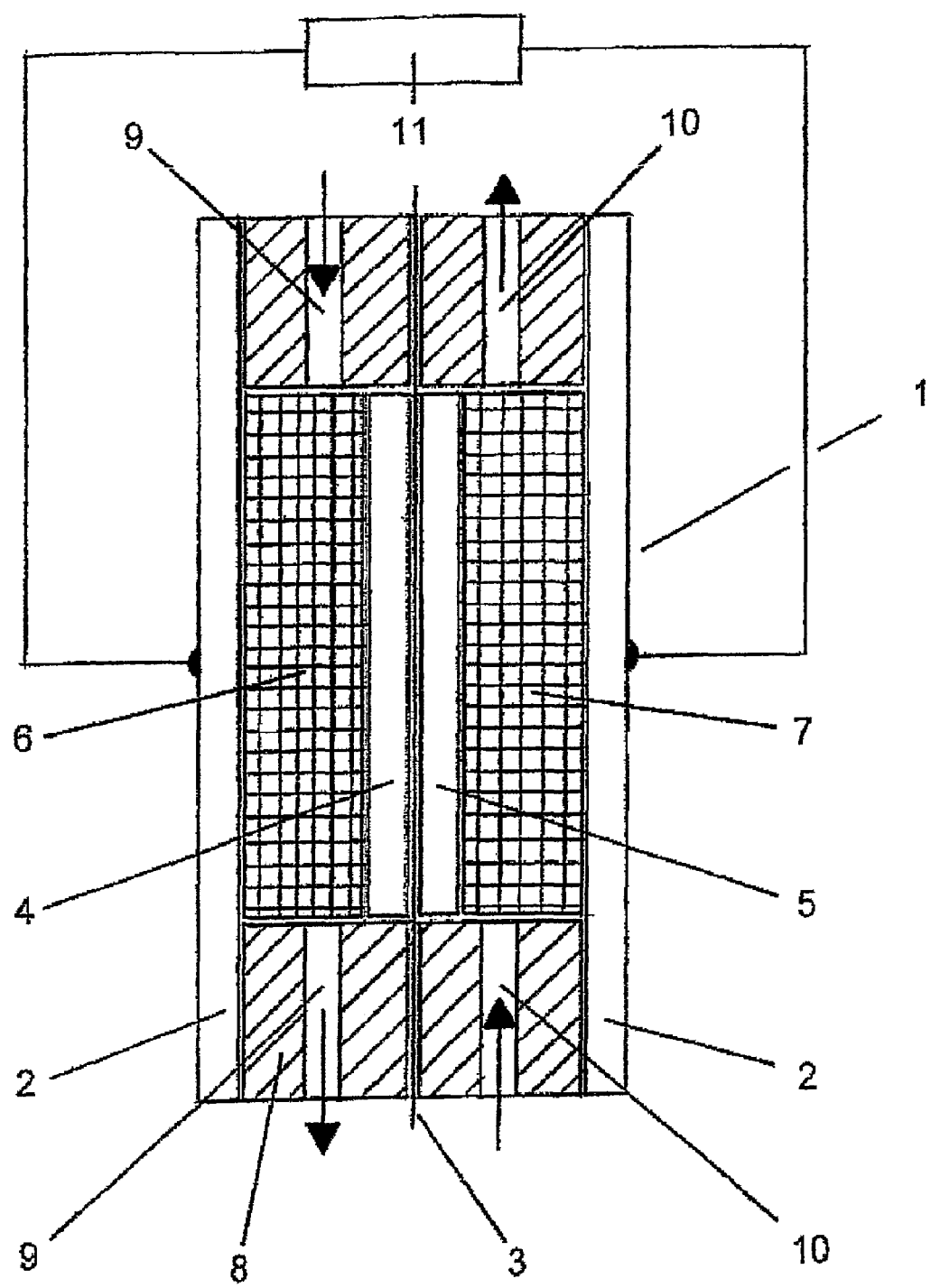
FIG. 1: schematic side-view of the fuel cell representing the first element of the unit of the invention, with the pure hydrogen and air feeds.

The lateral section of a fuel cell internal structure is sketched in FIG. 1, wherein (1) identifies the fuel cell in its entirety and wherein (2) indicates the conductive bipolar plates enclosing the internal components, (3) the ion-exchange membrane, (4) and (5) respectively the anode and the cathode, (6) and (7) the current collectors also taking the role of reactant gas distributors, (8) the perimetrical gaskets preventing the reactant gases to escape to the external environment, (9) and (10) the ducts contained, according to a possible embodiment, in the gaskets (8) for the feed/extraction of hydrogen and air respectively, (11) the user load of the output electrical energy. When fed with pure hydrogen supplied in a stoichiometric amount, this type of fuel cell is subject to performance decay as a consequence of a progressive build-up of nitrogen and liquid water which diffuse from the cathodic compartment across the membrane.

Figure 2:
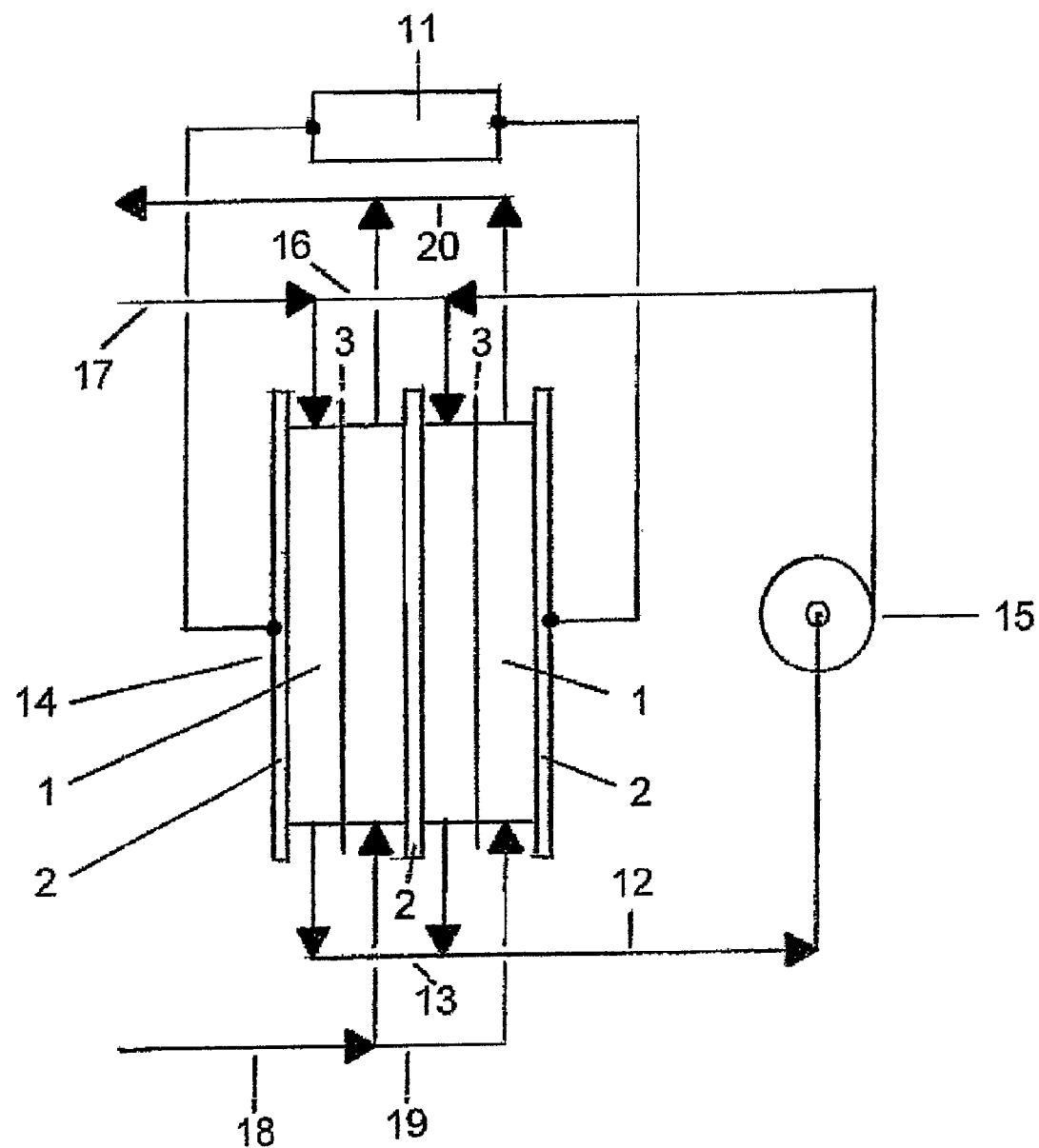
FIG. 2: stack of fuel cells of FIG. 1 with hydrogen external recirculation obtained according to the prior art by means of a mechanical pump.

A first solution to this problem proposed by the prior art is indicated in FIG. 2: the hydrogen (12) discharged in the manifold (13) by the stack (14) of fuel cells (1), limited to two for simplicity of illustration, is sucked in by the mechanical pump (15) and sent back under a suitable pressure into the distributing manifold (16), and thence to the anode compartments of the fuel cells (1). The hydrogen feed (17) is connected in its turn to the distributing manifold (16). The air feed (18) is sent to the distributing manifold (19) and thence to the cathode compartments of the fuel cells (1), the air discharged from the cathode compartments of the fuel cells (1) is collected in the manifold (20) and thence vented to the external environment. The high hydrogen flow-rate, combined with a little purge not shown in the figure, allows maintaining the nitrogen concentration at low levels and preventing liquid water build-ups on the fuel cell (1) anode compartment. Nevertheless, as a consequence of hydrogen apportionment defects from the distributing manifold (16) to the anode compartments of the individual fuel cells due to the production tolerance of the components and to assemblage irregularities particularly when the stacks (14) comprise a multiplicity of fuel cells, as normally occurs in the practice, the hydrogen flow-rates in some fuel cells may be sensibly reduced with respect to the average project value, to such an extent as to reestablish the phenomena of nitrogen enrichment and especially of liquid water build-up. For simplicity of illustration in FIG. 2 the fuel cells stack cooling circuits required to maintain the operating temperatures in the approximate range of 60-100° C. are not shown.

The same simplification is applied to the stacks of FIGS. 4, 5, 6 and 7.

Figure 3:
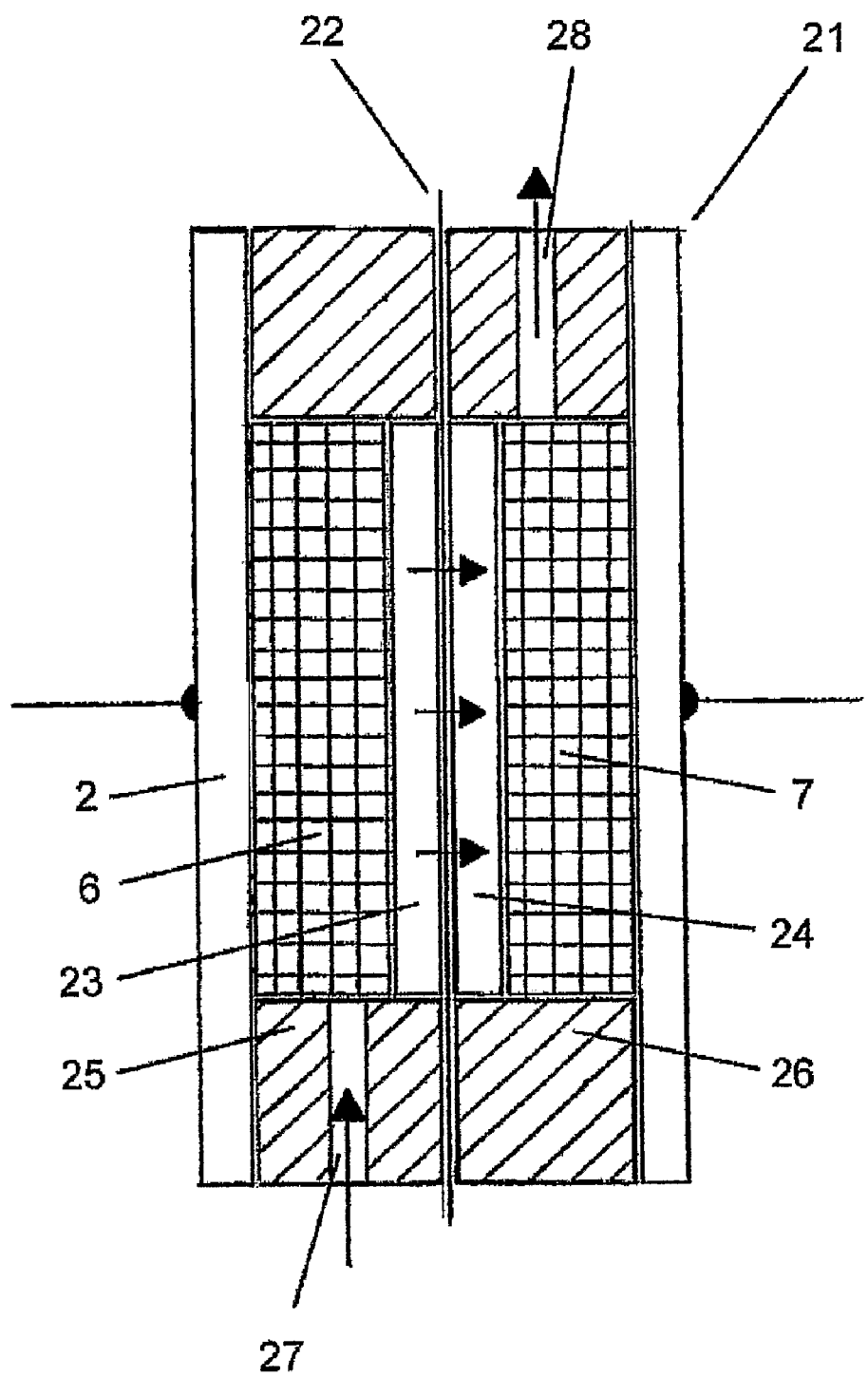
FIG. 3: schematic side-view of the hydrogen-transfer cell of the invention.

FIG. 3 represents a sketch of a lateral section of a hydrogen-transfer electrochemical cell as known in the prior art: in particular (21) indicates the cell in its entirety, (2) the two bipolar plates, equivalent to those described for the fuel cell of FIG. 1, (6) and (7) two current collectors also functioning as gas distributors, also equivalent to the current collectors described for the fuel cell of FIG. 1, (22) an ion-exchange membrane, (23) and (24) respectively the anode and the cathode, (25) and (26) the perimetrical gaskets for sealing the gases toward the external environment respectively provided with feed ducts for the hydrogen to be recycled (27) and with hydrogen discharge ducts (28) under a suitable pressure to be sent to the recycle. During operation, the hydrogen fed through (27) is ionised on the anode (23) with generation of protons which migrate across the membrane (22) to the cathode (24): on the cathode (24), the protons are again converted into hydrogen. The overall flux hydrogen→protons→hydrogen is indicated by the arrows.

Figure 4:
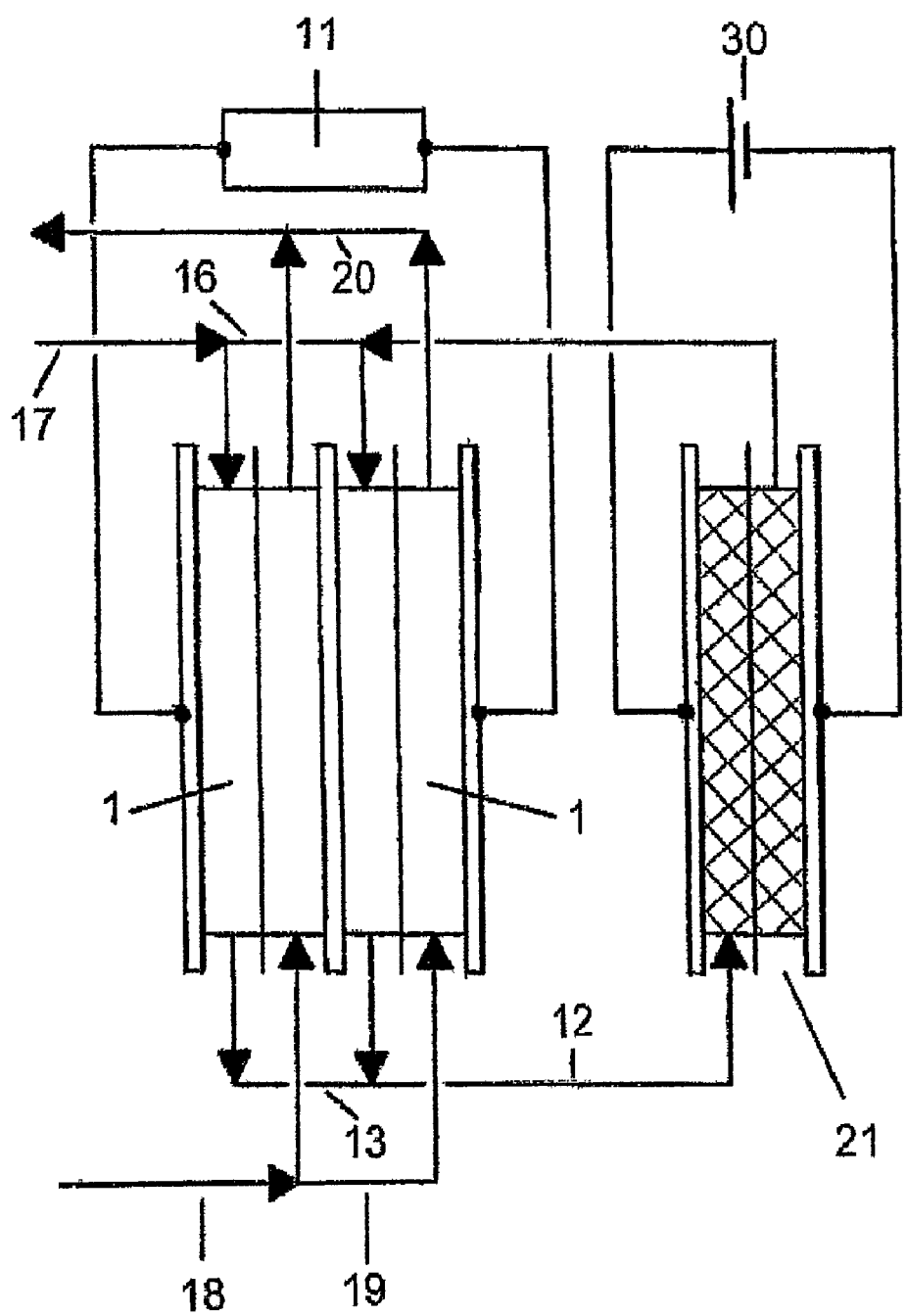
FIG. 4: stack of fuel cells of FIG. 1 with hydrogen internal recirculation obtained according to the prior art by means of the hydrogen-transfer cell of FIG. 3 installed as a separate element.
Figure 5:
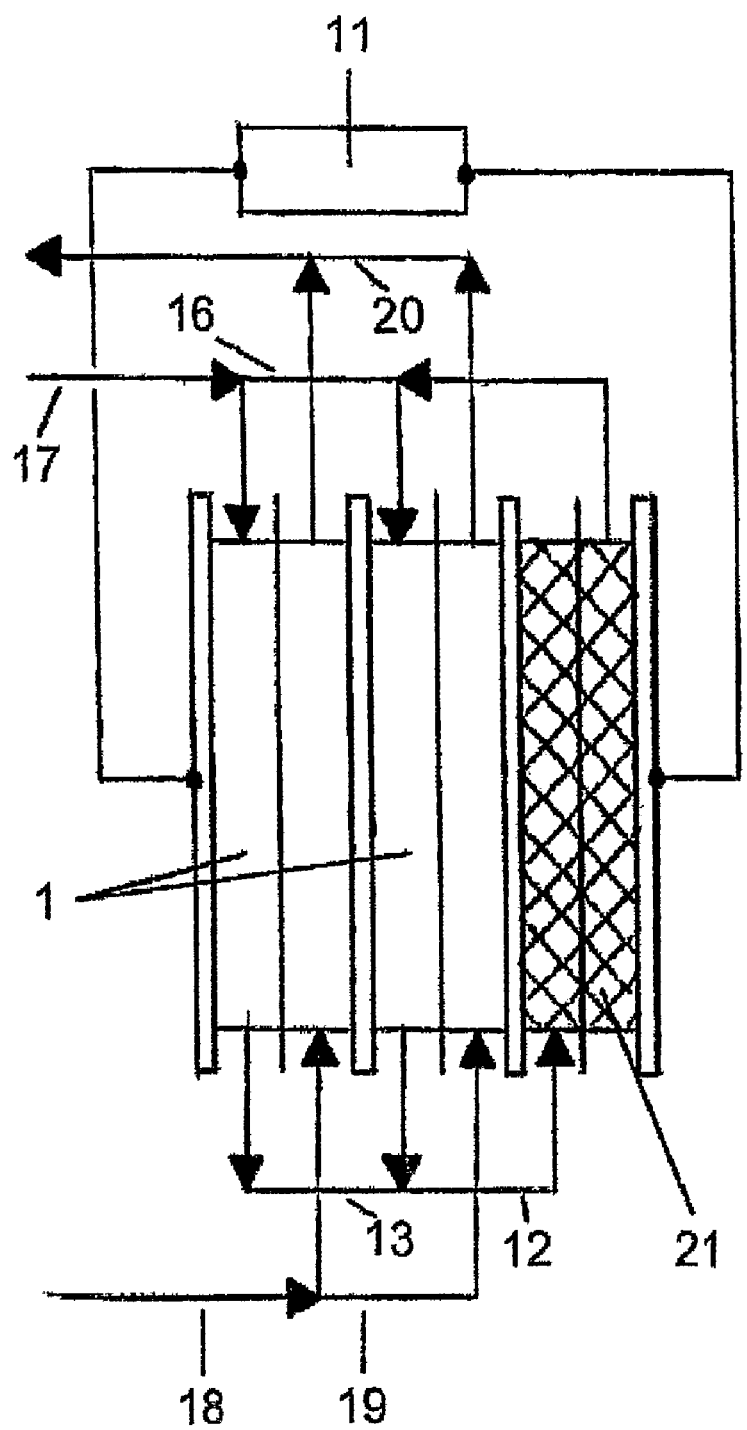
FIG. 5: stack of ion-exchange membrane fuel cells of FIG. 1 with hydrogen external recirculation obtained according to the prior art with the hydrogen-transfer cell of FIG. 3 mechanically associated with the fuel cell.

The prior art discloses the use of this kind of hydrogen-transfer cell as a replacement for the mechanical pump (15) of FIG. 2 according to the two alternatives illustrated in FIGS. 4 and 5, wherein the hydrogen-transfer electrochemical cell (21) is respectively installed as a separate module fed with a suitable external electrical generator (30) or mechanically assembled in a single stack together with the fuel cells (1). Only two fuel cells are shown in this and in other figures of the present application for the sake of simplicity but in principle, any number of fuel cells can be laminated in a stack. In the latter case, the hydrogen-transfer cell is operated making use of part of the electrical output of the fuel cell. The other elements of the circuit are entirely equivalent to those of FIG. 2 and are therefore identified with the same numerals.

In operation, the ionisation of hydrogen on the anode (23) causes a certain depression which favours the inlet flow to the hydrogen-transfer cell through the duct (27), while the reconversion of protons to hydrogen on the cathode (24) produces a certain pressurisation which directs hydrogen to the manifold (16) and thence to the fuel cell (1) anode compartments. Both kinds of circuit of FIGS. 4 and 5 suffer the same problem seen in the case of the circuit of FIG. 2, due as mentioned to the practical difficulty of maintaining an adequate hydrogen flow in each fuel cell of the multiplicity normally making up a stack.

The present invention is directed to solve the problem of nitrogen and liquid water build-up on the anode compartment of membrane fuel cells fed with pure hydrogen overcoming the drawbacks of the prior art.

Figure 6:
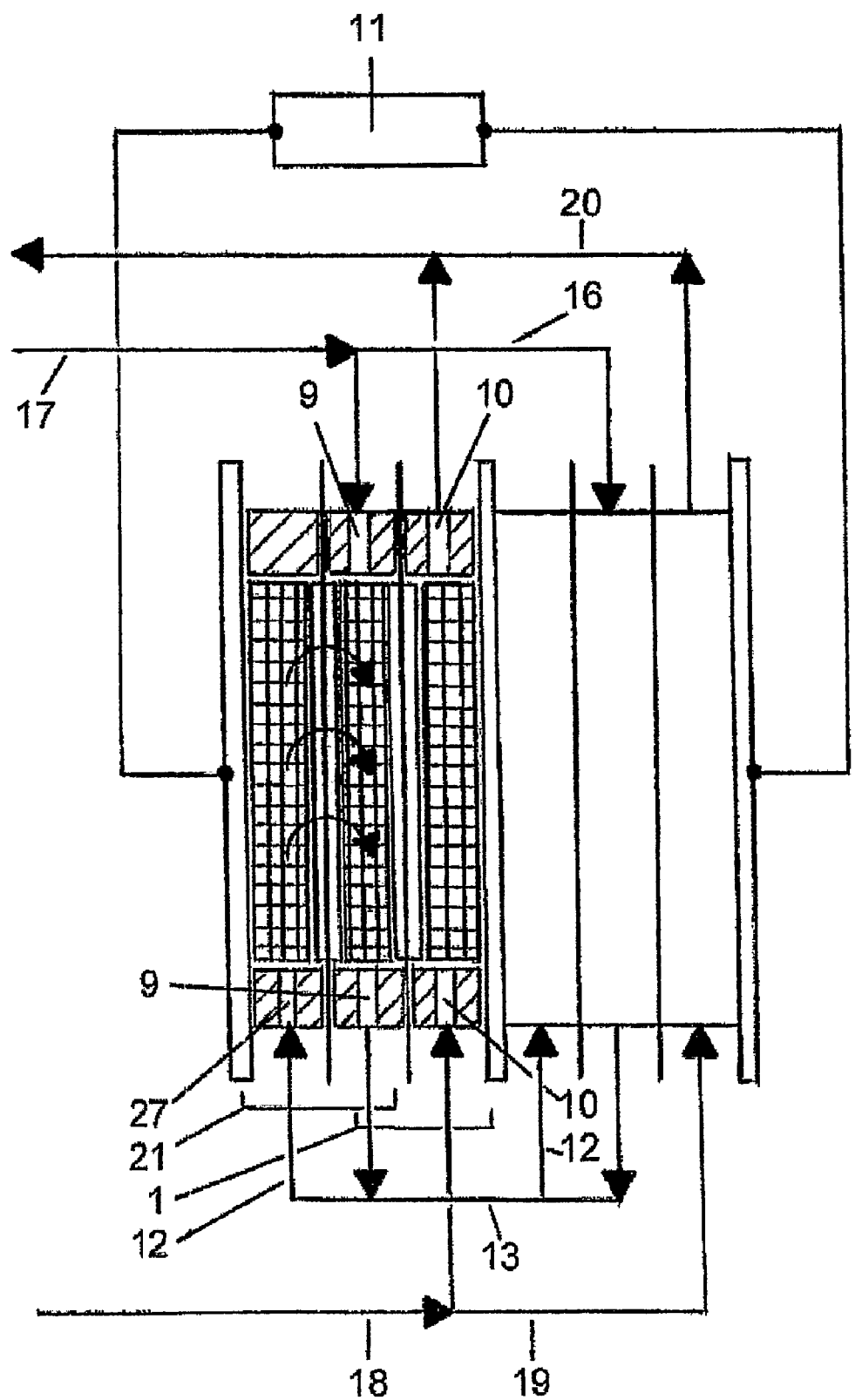
FIG. 6: stack comprising two units according to a first embodiment of the invention, with partial lateral section, wherein each unit consists of the fuel cell of FIG. 1 integrated with the hydrogen-transfer cell of FIG. 3 by common lamination, with the fuel cell and hydrogen-transfer cell components enclosed between two bipolar plates and with internal recirculation of hydrogen.

A first embodiment of the invention is represented in FIG. 6, which sketches a side-view of a stack comprising, only for the sake of graphic simplification, two units each consisting of a fuel cell (1) of the type of FIG. 1 co-laminated and integrated with a hydrogen-transfer cell (21) of FIG. 3.

The side-view of the stack is partially represented in section and shows the integration in accordance with the invention between the components of a hydrogen-transfer cell (21) and an adjacent fuel cell (1): in particular, the cathodic current collector of the hydrogen-transfer cell also constitutes the fuel cell anodic current collector and hence the hydrogen-transfer cell (21) cathode compartment acts as the fuel cell (1) anode compartment. As a consequence, the gap comprised between two consecutive bipolar plates results subdivided into three portions, respectively, proceeding from left to right: hydrogen-transfer cell anode compartment; hydrogen-transfer cell cathode compartment coinciding with the fuel cell anode compartment; and fuel cell cathode compartment. During operation, the pure hydrogen feed (17) is introduced into the distributing manifold (16) and thence in the fuel cell (1) anode compartment. The hydrogen (12) discharged from the fuel cells into the manifold (13) is sucked in by the hydrogen-transfer cells and ionised to protons on the anode (23). Protons migrate across the membrane (22) and are reconverted to hydrogen at the cathode (24). The hydrogen formed at the cathode (24) is not sent to the external distributing manifold (16), as was the case of the prior art, but is instead mixed to the hydrogen feed coming from the distributing manifold (16) directly inside the fuel cell: in this way a safe hydrogen recirculation is achieved depending only on the electric current crossing the stack, by no means affected by possible problems of distribution of the gas flow associated with production tolerances or assembly inaccuracies. The internal recycle flux: hydrogen on the hydrogen-transfer cell anode compartment→protons→hydrogen on the fuel cell anode compartment is indicated by the arrows.

Figure 7:
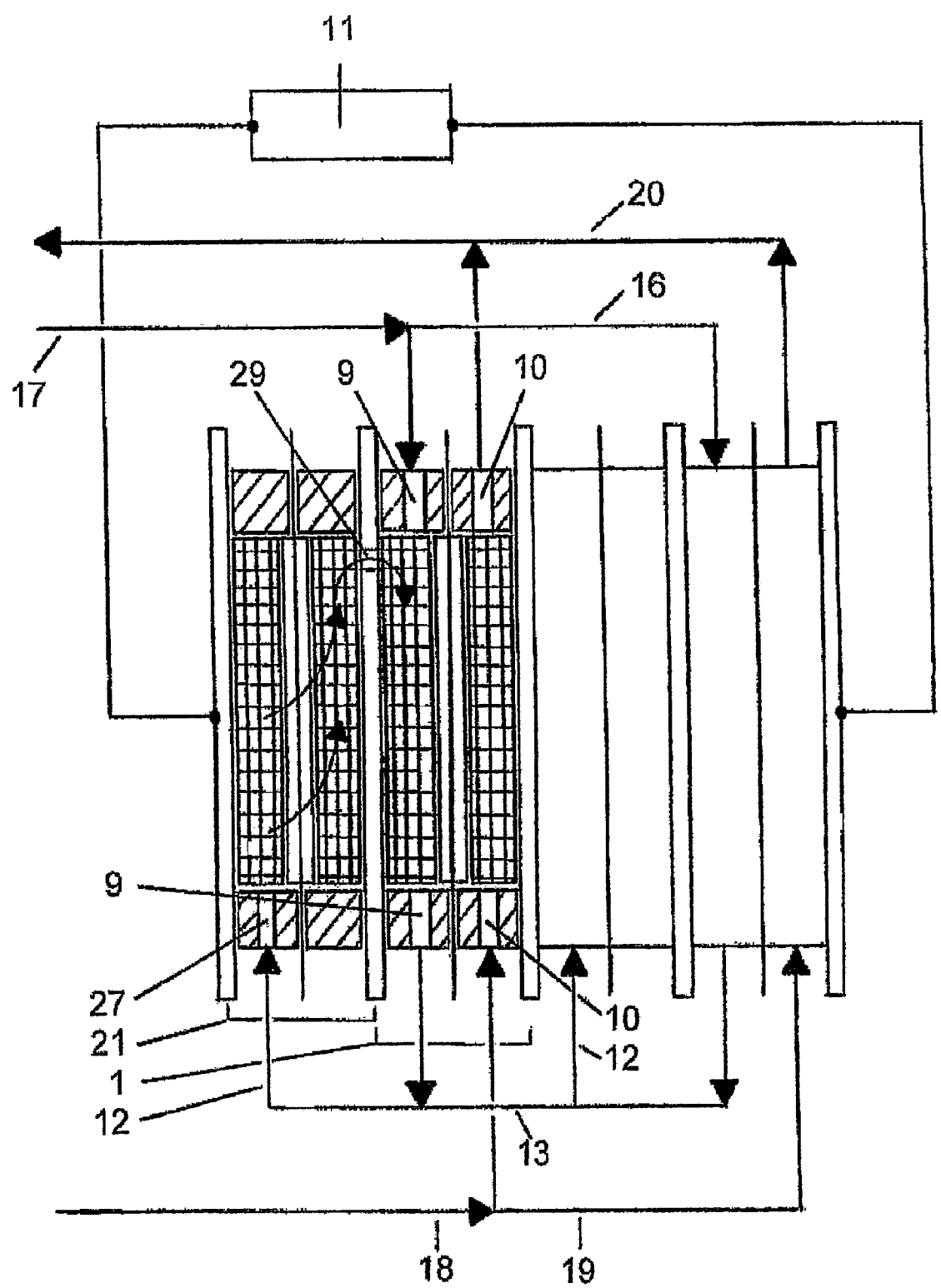
FIG. 7: stack comprising two units in accordance with an alternative embodiment of the invention, with partial lateral section, wherein each unit consists of the fuel cell of FIG. 1 mechanically associated by common lamination with the hydrogen-transfer cell of FIG. 3, with the fuel cell and hydrogen-transfer cell components enclosed between two external bipolar plates and kept separate by a further intermediate bipolar plate, with internal hydrogen recirculation.

A second embodiment of the invention is represented in FIG. 7, which sketches a side-view of a stack comprising two units, each consisting of a fuel cell (1) of the type of FIG. 1 mechanically associated by common lamination with a hydrogen-transfer electrochemical cell (21) of FIG. 3. The partial section of the side-view shows that the hydrogen-transfer cell (21) and the adjacent fuel cell (1), comprised between two external bipolar plates, maintain their identity being kept separate by a further intermediate bipolar plate. In this case the integration between the hydrogen-transfer cell and the fuel cell is of functional type: the hydrogen produced at the cathode (24) of the hydrogen-transfer cell is in fact injected into the fuel cell anode compartment through a series of aligned holes, indicated as (29), on the intermediate bipolar plate. in particular, the recycled hydrogen is not sent to the external distributing manifold (16) as occurs in the prior art. Hence, also with the latter constructive solution, an internal hydrogen recycle not affected by possible problems of bad distribution associated the with production tolerance of the various components and with assembly inaccuracies is obtained. A similar result might be obtained with an alternative internal design based on appropriate ducts, not shown in the figure, obtained inside the gaskets (26) and (8) coupled to corresponding holes made on the intermediate bipolar plate. The flux: hydrogen→protons→hydrogen on the hydrogen-transfer cell anode compartment→holes on the intermediate bipolar plate→hydrogen on the fuel cell anode compartment is indicated by the arrows.

The stack according to the invention consisting of fuel cells co-laminated and integrated or mechanically associated with hydrogen-transfer electrochemical cells is certainly characterised by higher volume and weight than those typical of the stack only comprising fuel cells, and at first sight it may seem penalised in automotive applications wherein volumes and weights must be evidently minimised. However the stack of the invention is provided with hydrogen internal recycle, therefore allowing to get rid of the external mechanical pump with the relevant connections and flow-rate regulations, so that the effective overall bulks and weights are not substantially changed. Furthermore the operative reliability of the stack of the invention is certainly higher since the stack is practically a solid-state device consisting of fixed parts only, and therefore free of the rotating parts of the mechanical recirculation pump. The stack of the invention finally allows particularly simplified regulations: as in fact the hydrogen-transfer cells are connected to the fuel cells in electrical series, the stack current output to the electrical user loads also determines the hydrogen recycle flow-rate. Moreover, since the output current also determines the hydrogen feed flow-rate, the ratio between the two feed and recycle flow-rates is always constant and equal to 1. Conversely, in the case of the conventional systems comprising the external recycle mechanical pump, it is necessary to send a signal proportional to the output current to a control device which consequently provides for the regulation of the rotating speed of the electric engine associated with the pump.

A further objection which could be raised against the stack of the invention regards the required investment, particularly as concerns the anode—membrane—cathode assemblies of the hydrogen-transfer electrochemical cells which are in the same amount as the equivalent fuel cell assemblies. The latter are in fact rather expensive components as they have to make use of perfluorinated membranes, the only one known for the time being which ensure an adequate chemical inertia toward the aggressive radical intermediates formed on the cathode by the reduction of the oxygen of air. Moreover, the oxygen reaction rate becomes acceptable only with relevant amounts of platinum-based catalysts. evertheless, the assemblies incorporated in the hydrogen-transfer cells turn out to be largely cheaper: in this case, in fact, both the anodic and the cathodic reaction involve the presence of hydrogen and not of oxygen with the associated radical intermediates, and as a consequence it is possible to resort to the cheap hydrocarbon-type ion-exchange membranes. Furthermore, since both the hydrogen anodic ionisation to form protons and the proton cathodic reconversion to hydrogen have very fast kinetics, it is possible to use very limited amounts of platinum-based catalysts. The only requirement for the assemblies incorporated in the hydrogen-transfer cells is that their internal impedance should preferably be limited around a value not higher than 100-150 milliohm.cm$^2$, so as to absorb modest fractions of electrical energy during operation.

One application of the present invention is disclosed in the following example, which should in no way be intended as a limitation but just as an exemplification for a better comprehension of the obtainable advantages.

A stack of the type sketched in FIG. 6 was assembled with 70 fuel cells intercalated with an equal number of hydrogen-transfer electrochemical cells, with the following characteristic elements:

active area of each fuel cell and of each hydrogen-transfer cell: 500 cm$^2$.

PRIMEA® type anode—perfluorinated membrane—cathode assemblies for fuel cell, with a total 1 mg/cm$^2$ of Pt, provided by Gore/Japan.

anode—hydrocarbon-type membrane—cathode experimental assemblies for hydrogen-transfer cell with a total 0.2 mg/cm$^2$ of Pt.

AISI 316L-type stainless steel bipolar plates.

current collectors of nickel-chromium metal foam.

punched gaskets of ABS polymer.

air feed with twice the theoretical flow-rate required for each level of current output, at a pressure of 1.3 bar abs.

self-regulated hydrogen feed as a function of the current output and the purges, at a pressure of 1.8 bar abs.

hydrogen purging every 20 minutes, approximately corresponding to 2% of the total feed.

stack cooling with cooling water at constant flow-rate and with inlet and outlet temperature of respectively 51 and 53° C.

output current: 100 A.

overall stack voltage: 47 V, constant during a test duration of 1200 hours.

average voltage of a single fuel cell: 0.7 V.

average voltage of a single hydrogen-transfer cell: 0.03 V.

The above listed data show that it is possible to obtain a stable operation in time of a big stack thanks to the hydrogen internal recycle achieved according to the first embodiment of the invention, The data also show that the electric power absorbed by the hydrogen-transfer cells to ensure the hydrogen internal recycle in all of the fuel cells is equal to 210 W (0.03×70×100) corresponding to about 5% of the 4900 W power (0.7×70×100) that the fuel cells can generate.

The invention claimed is:

1. A unit comprising a membrane fuel cell comprising a fuel cell anodic compartment and a fuel cell cathodic compartment, wherein said membrane fuel cell is connected in electrical series to a hydrogen-transfer electrochemical cell subdivided by an ion-exchange membrane into one hydrogen-transfer cell anodic compartment and one hydrogen-transfer cell cathodic compartment, wherein said hydrogen-transfer cell anodic compartment is fluidly connected to an exhaust output of said fuel cell anodic compartment, and said fuel cell anodic compartment is fluidly connected to an output of said hydrogen-transfer cell cathodic compartment.

2. The unit of claim 1 wherein said fuel cell and said hydrogen-transfer cell are co-laminated into an integrated structure delimited by two external bipolar plates.

3. The unit of claim 2 wherein said fuel cell anodic compartment coincides with said hydrogen-transfer cell cathodic compartment.

4. The unit of claim 3 wherein said fuel cell anodic compartment coinciding with said hydrogen-transfer cell cathodic compartment contains a reticulated metal current collector.

5. The unit of claim 1 wherein said fuel cell and said hydrogen-transfer cell are co-laminated into an integrated structure delimited by two external bipolar plates and comprising an intermediate bipolar plate separating said fuel cell from said hydrogen-transfer cell.

6. The unit of claim 5 wherein said intermediate bipolar plate is provided with holes permitting the internal recycle of said exhaust output of said fuel cell anodic compartment to said hydrogen-transfer cell anodic compartment.

7. The unit of claim 6 wherein said fuel cell and said hydrogen-transfer cell comprise perimetrical gaskets provided with holes aligned to said holes of said intermediate bipolar plate forming by juxtaposition a duct permitting the internal recycle of said exhaust output of said fuel cell anodic compartment to said hydrogen-transfer cell anodic compartment.

8. The unit of claim 1 wherein said fuel cell is provided with a connection for the discharge of the exhaust output of said fuel cell anodic compartment connected to the hydrogen-transfer cell anodic compartment and to a purging device.

9. The unit of claim 1 wherein said ion-exchange membrane subdividing said hydrogen-transfer cell into one hydrogen-transfer cell anodic compartment and one hydrogen-transfer cell cathodic compartment is a hydrocarbon membrane.

10. The unit of claim 1 wherein said ion-exchange membrane subdividing said hydrogen-transfer cell into one hydrogen-transfer cell anodic compartment and one hydrogen-transfer cell cathodic compartment comprises an anode and a cathode with an overall content of noble metal not exceeding 0.5 mg/cm$^2$.

11. A direct electric current generator comprising a multiplicity of units of claim 1 in electrical series.

12. The generator of claim 11 comprising a common manifold for feeding hydrogen to said fuel cells of said units.

13. The generator of claim 11 having a common manifold for the discharge of said exhaust output from said fuel cell anodic compartments connected to the hydrogen-transfer cell anodic compartments.

14. A method of production of electrical energy through the generator of claim 11 wherein said fuel cell anodic compartments are fed with hydrogen, wherein a fraction of said hydrogen is provided by the output of said hydrogen-transfer cell cathodic compartments, and wherein the fraction of hydrogen fed to the fuel cell anodic compartments from the output of said hydrogen-transfer cell cathodic compartments equals half of the overall hydrogen fed to the fuel cell anodic compartments.

\* \* \* \* \*